April 18, 1933.  C. N. McMANIS  1,904,797
AUTOMOBILE DIFFERENTIAL
Filed April 26, 1932   3 Sheets-Sheet 1
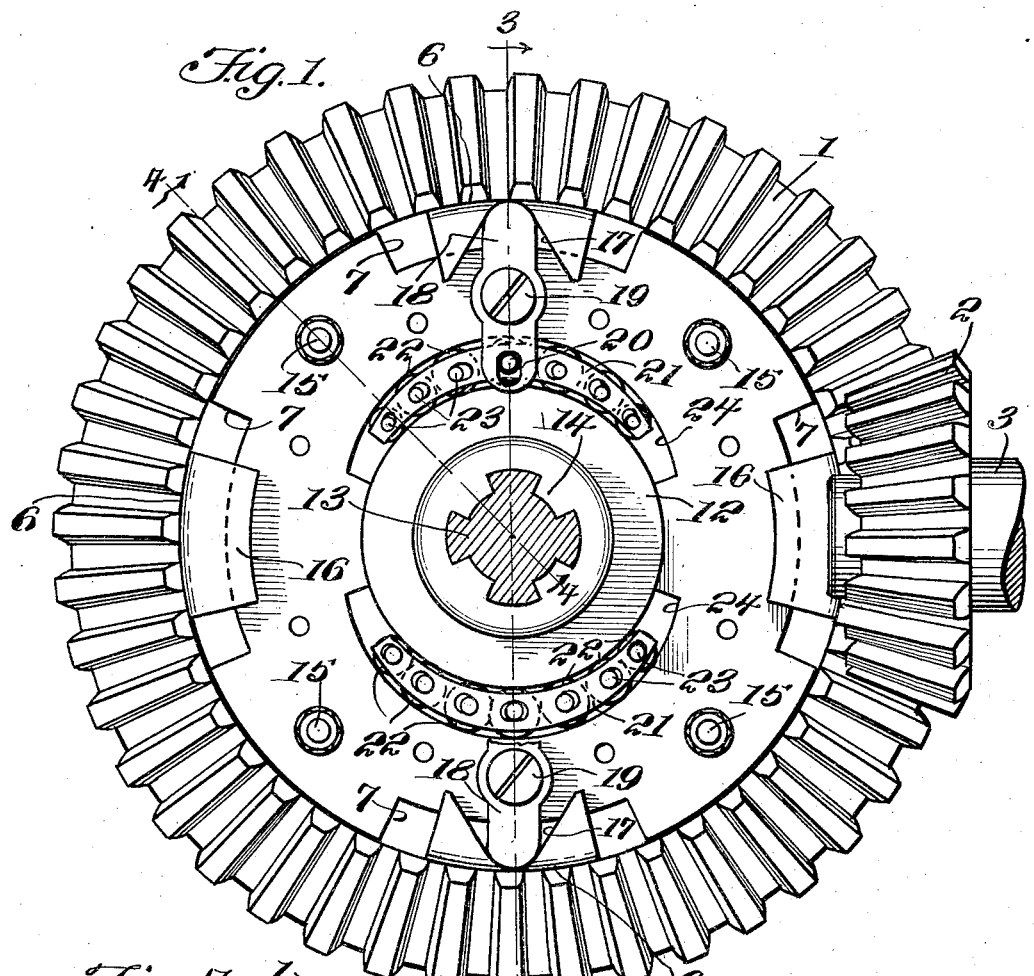
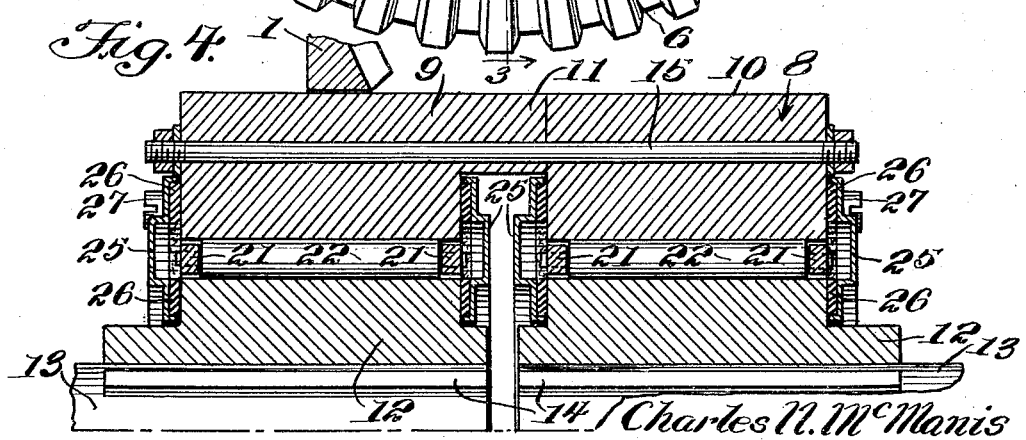

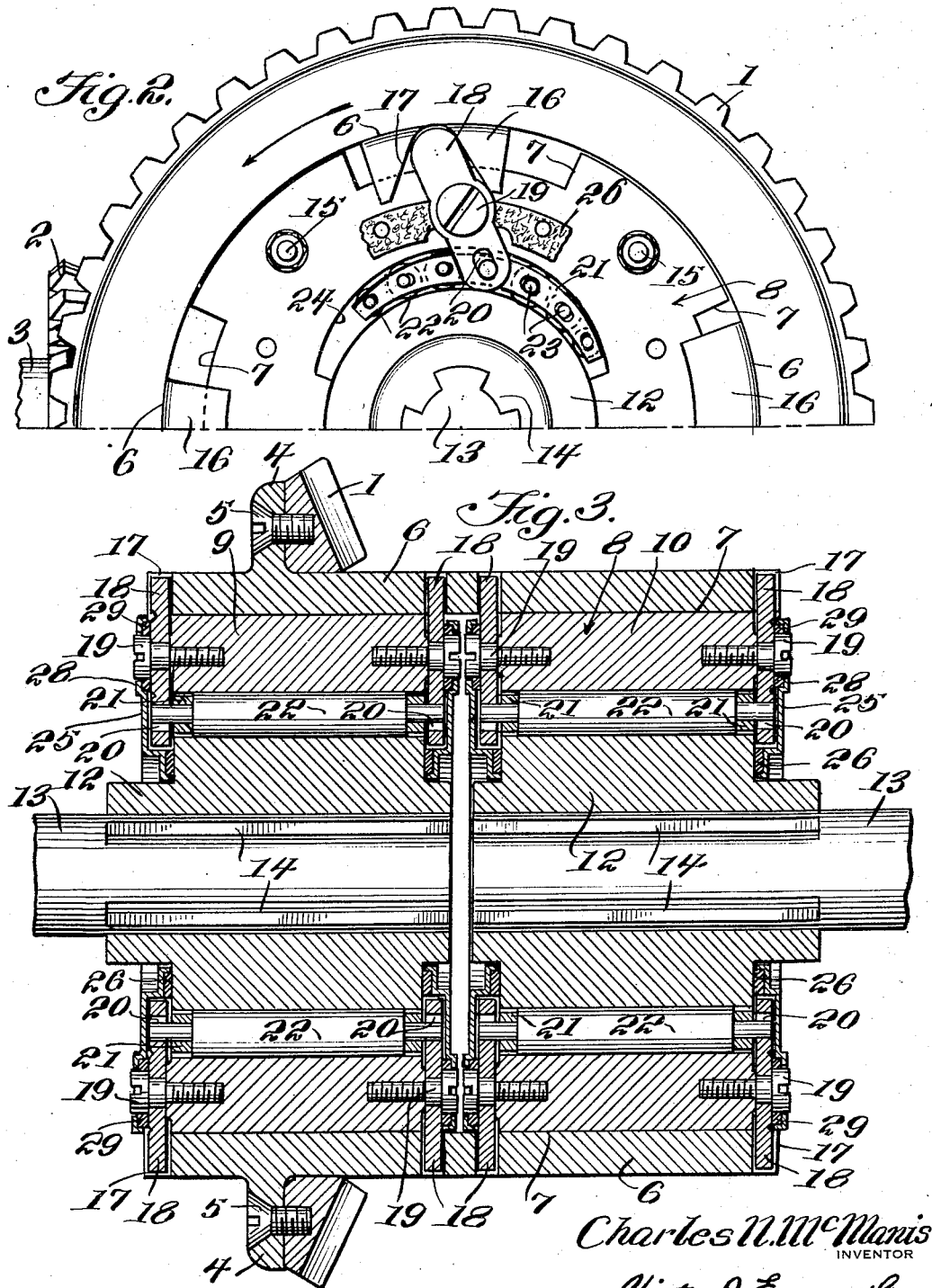

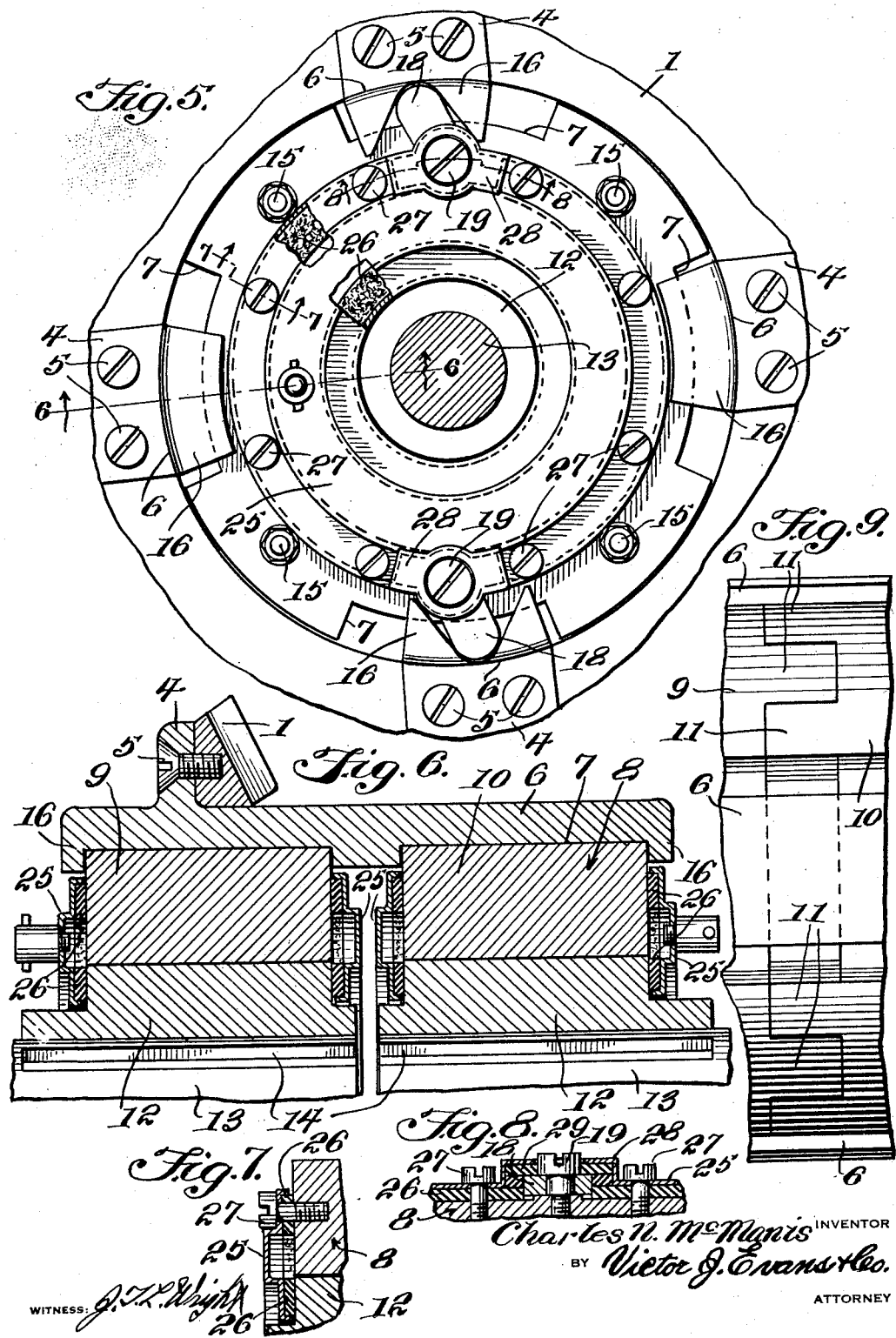

Patented Apr. 18, 1933

1,904,797

UNITED STATES PATENT OFFICE

CHARLES N. McMANIS, OF MITCHELL, SOUTH DAKOTA

AUTOMOBILE DIFFERENTIAL

Application filed April 26, 1932. Serial No. 607,621.

This invention relates to differentials for motor vehicles and has for the primary object, the provision of a device of the above stated character, whereby free wheeling may be provided between the power source and the drive wheels of the vehicle and also provide a positive drive to either of said drive wheels from the power source when one or the other of said wheels loses traction, consequently preventing stalling of the vehicle and still permitting either wheel to rotate faster than the other wheel when making a turn in either direction from a straight course.

Another object of this invention is the provision of a drive between the ordinary ring gear and the wheel axle, whereby differential movement between the axles may be had with free wheeling between the axles and the power source and permitting the axles to be driven by the power source in either direction.

A further object of this invention is the provision of a drive of the above stated character which is simple and durable in construction and consists of a minimum number of parts to materially reduce the cost of manufacture and maintenance and permitting greater road clearance.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a differential constructed in accordance with my invention.

Figure 2 is a fragmentary side elevation partly in section illustrating the parts positioned to establish driving connection between the ring gear and the wheel axles.

Figure 3 is a sectional view taken on the line 3—3 of Figure 1.

Figure 4 is a fragmentary transverse sectional view taken on the line 4—4 of Figure 1.

Figure 5 is a side elevation partly in section illustrating the device occupying a position to establish driving connection between the ring gear and the wheel axles.

Figure 6 is a fragmentary sectional view taken on the line 6—6 of Figure 5.

Figure 7 is a detail sectional view taken on the line 7—7 of Figure 5.

Figure 8 is a detail sectional view taken on the line 8—8 of Figure 5.

Figure 9 is a fragmentary plan view illustrating the connections between the sections of the mounting of the differential.

Referring in detail to the drawings, the numeral 1 indicates a ring gear meshing with a drive pinion 2 secured to a power shaft 3 receiving its power from a power source, not shown. The ring gear 1 is detachably secured to lugs 4 by fasteners 5 and the lugs are formed integrally with bars 6 arranged transversely of the ring gear and are mounted in grooves 7 formed in the periphery of an annular mounting 8 consisting of sections 9 and 10. The opposing faces of the sections 9 and 10 are notched or recessed to form shoulders or lugs 11 having interfitting connection with each other to establish a driving connection between the sections 9 and 10 of the mounting 8. The bars 6 are capable of a limited sliding movement circumferentially of the mounting 8 consequently permitting the ring gear to have corresponding movement to the mounting and said mounting is journalled on bearings 12 of annular formation and keyed to power axles 13 as shown at 14. The sections 9 and 10 of the mounting 8 are detachably secured together by tie rods 15 and the ends of the bars 6 are provided with flanges 16 overlying the side faces of the sections 9 and 10 of the mounting 8 and are provided with notches 17 to receive the outer ends of pivotally mounted levers 18. The levers are journalled on pivot bolts 19 threaded to the sections 9 and 10 of the mounting 8 while the inner ends of the levers have pin and slot connections 20 with cages 21 that rotatably support rollers 22. The ends of the rollers are provided with trunnions 23 fitting in slots of the cages 21 whereby said rollers are capable of a limited shifting movement within said cages. The rollers are located within arcuate shaped chambers 24 arranged at opposite sides of the bearings 12. The chambers 24 taper toward each end and are formed in the sections 9 and 10 of the mounting 8 by recessing said mounting and allowing the rollers when in certain positions to wedge between the inner walls of the recesses and the peripheries of the bearings 12.

The neutral position of the levers 18 is as shown in Figure 1 for positioning the rollers so that they are free from contact with the walls of the chambers and the peripheries of the bearings 12 and when power is delivered to the ring gear in the direction indicated by the arrow in Figure 2, the ring gear shifts slightly relative to the mounting causing the levers to assume the position shown in Figure 2 wedging the rollers between the walls of the recesses and chambers and the peripheries of the bearings 12 thereby establishing a driving connection between the ring gear and the axles which will permit either axle to rotate faster than the other when the vehicle to which the differential is applied is negotiating a turn and still permitting one of the axles to receive power from the ring gear. Should one of the axles or its respective wheel lose traction, the other axle still receives power from the ring gear, consequently preventing stalling of the vehicle. When the momentum of the vehicle is such that the axles or their wheels rotate faster than the power shaft 3 or the power source of the vehicle, the axles and their bearings 12 then will rotate free of the mounting 8 and the ring gear due to the rollers and their cages connected to the levers 18 and the latter connected to the ring gear in the manner heretofore described provides double acting overrunning clutches.

In order to obtain lubricant in the chambers 24 for the rollers 22 and the pivoted levers 18, closure plates 25 are provided with suitable gaskets 26 and are removably secured in place by fasteners 27. The cover plates 25 are provided with offset portions 28 about the pivots 19 and have located therein gaskets 29 which permit the levers 18 to pivot and still prevent the escape of lubricant.

From the foregoing description taken in connection with the accompanying drawings, it can be seen that a differential is provided capable of permitting differential movements between the wheel axles and also providing free wheeling between said wheel axles and the power source and still permitting power to be delivered from the power source in a positive manner to either of the axles. Further it is to be noted that the differential is capable of driving the wheel axles in either direction from the power source and that the construction involved is simple and durable and consists of a minimum number of parts and obviates the employment of spiders and spider gears conventionally employed in differentials.

While I have shown and described the preferred embodiment of my invention, it will be understood that minor changes in construction, combination and arrangement of parts may be made without departing from the spirit and scope of my invention, as claimed.

Having thus described my invention, what I claim is:

1. A differential comprising a mounting having grooves, bars mounted in said grooves for limited circumferential movement relative to the mounting, a ring gear secured to said bars, bearings journalled in said mounting, double acting overrunning clutches between said bearings and the mounting, pivotally mounted levers between the clutches and the bars for rendering the clutches operative and inoperative by the movement of the ring gear relative to the mounting and to permit the bearings to rotate free of the mounting when the power on said bearings exceeds the power on the mounting.

2. A differential comprising a mounting having grooves, bars mounted in said grooves for limited movement relative to the mounting and circumferentially thereof, a ring gear carried by said bars, bearings journalled in the mounting, axles secured to said bearings, said mounting having chambers communicative with the peripheries of the bearings and tapering toward their ends, rollers mounted in said chambers, cages for connecting the rollers of each chamber together, pivotally mounted levers connected to the cages and to the bars for causing said rollers to lock the mounting to the bearings and to disconnect the mounting to the bearings according to the movement of the ring gear relative to the mounting.

3. A differential comprising a mounting having grooves, bars mounted in said grooves for limited movement relative to the mounting and circumferentially thereof, a ring gear carried by said bars, bearings journalled in the mounting, axles secured to said bearings, said mounting having chambers communicative with the peripheries of the bearings and tapering toward their ends, rollers mounted in said chambers, cages for connecting the rollers of each chamber together, pivotally mounted levers connected to the cages and to the bars for causing said rollers to lock the mounting to the bearings and to disconnect the mounting to the bearings according to the movement of the ring gear relative to the mounting, and closure means for enclosing the chambers and portions of the levers to retain lubricant therein.

In testimony whereof I affix my signature.

CHARLES N. McMANIS.